United States Patent
Rastel et al.

(10) Patent No.: US 7,258,646 B2
(45) Date of Patent: Aug. 21, 2007

(54) DIFFERENTIAL GEAR FOR VEHICLES

(75) Inventors: Hans Rastel, Windach (DE); Stefan Schinagl, Munich (DE); Frank Gielisch, Karlsfeld (DE); Wolfgang Steinberger, Herzogenaurach (DE)

(73) Assignee: Bayerische Motoren Werke Aktiengesellschafy, Munich (DE)

( * ) Notice: Subject to any disclaimer, the term of this patent is extended or adjusted under 35 U.S.C. 154(b) by 0 days.

(21) Appl. No.: 11/358,039

(22) Filed: Feb. 22, 2006

(65) Prior Publication Data
US 2006/0234824 A1 Oct. 19, 2006

Related U.S. Application Data

(63) Continuation of application No. PCT/EP2004/007933, filed on Jul. 15, 2004.

(30) Foreign Application Priority Data
Aug. 22, 2003 (DE) ................ 103 38 635

(51) Int. Cl.
*F16H 48/06* (2006.01)
(52) U.S. Cl. .................... 475/247; 384/563
(58) Field of Classification Search ............. 475/247; 384/563
See application file for complete search history.

(56) References Cited

U.S. PATENT DOCUMENTS

| | | | |
|---|---|---|---|
| 2,680,972 A * | 6/1954 | Tone | ............................. 475/9 |
| 4,033,644 A | 7/1977 | Reneerkens | |
| 4,103,567 A | 8/1978 | Franco et al. | |
| 4,173,376 A | 11/1979 | Sheppard et al. | |
| 5,364,194 A | 11/1994 | Lubin | |
| 5,624,345 A * | 4/1997 | Graft et al. | ................ 475/230 |

FOREIGN PATENT DOCUMENTS

| | | |
|---|---|---|
| DE | 196 07 336 | 8/1997 |
| DE | 199 46 383 | 4/2001 |
| EP | 0 603 510 | 6/1994 |
| GB | 2 386 652 | 9/2003 |

OTHER PUBLICATIONS

International Search Report dated Nov. 30, 2004.

* cited by examiner

*Primary Examiner*—Tisha Lewis
(74) *Attorney, Agent, or Firm*—Crowell & Moring LLP

(57) ABSTRACT

Differential gearing for vehicles, having a gearing input and two gearing output shafts which exit on mutually opposite sides of a differential gearing housing from the differential gearing housing, having a differential holder which is arranged in the differential gearing housing in the area between the gearing output shafts, the differential holder being rotatably disposed in the differential gearing housing by means of a ball bearing arrangement which has a bearing prestress. At least one disk spring is provided which generates the bearing prestress of the ball bearing arrangement.

17 Claims, 1 Drawing Sheet

DIFFERENTIAL GEAR FOR VEHICLES

CROSS-REFERENCE TO RELATED APPLICATIONS

This application is a continuation of PCT Application No. PCT/EP2004/007933 filed on Jul. 15, 2004, which claims priority to German Application 103 38 635.1 filed Aug. 22, 2003.

BACKGROUND AND SUMMARY OF THE INVENTION

The present invention relates to a differential gearing for vehicles.

Differential gearings primarily have the object of distributing an input rotational speed or an input torque to two gearing output shafts connected with driving wheels and, in the process, render possible the rotational speed differences occurring when cornering between the wheel on the inside during the cornering and the wheel on the outside during the cornering. During the transmission of high driving powers, differential gearing may become very hot. The prestressing of the bearings by way of which the differential holder is disposed in the differential gear housing will then frequently change as a result of thermal expansions. A decrease of the bearing prestress in the differential gearing has a negative effect on the acoustic behavior; that is, the gear cutting noise becomes louder. In addition, there is the danger that the service life of the differential gearing is reduced when the bearing prestress is changed.

From German Patent Documents DE 199 46 383 A1 and DE 196 07 336 A1, various possibilities are known for generating or maintaining a prestressing of the bearings. A prestressing force can be generated, for example, hydraulically, by spiral springs, disk springs, etc.

It is an object of the invention to create a differential gearing where the prestressing of the bearings of the differential holder rotatably disposed in the housing of the differential gearing remains as optimal as possible also at different operating temperatures.

The invention is based on a differential gearing for vehicles which is known per se and which has a gearing input and two gearing output shafts which exit from the differential gearing housing on mutually opposite sides. In the differential gearing housing, a differential holder is arranged in the area between the gearing output shafts. The differential holder is rotatably disposed in the differential gearing housing by means of a ball bearing arrangement which has an axial bearing prestressing defined by the mounting.

A basic principle of the invention consists of providing at least one disk spring which generates the axial prestressing of the ball bearing arrangement. By means of the at least one disk spring, it is ensured that the axial prestressing of the bearings remains essentially constant in the case of temperature-caused thermal expansions of individual differential gearing housing components.

According to a further development of the invention, the differential gearing housing consists of an aluminum material. Aluminum housings have the advantage that, in comparison to other casting materials, they have a relatively low specific weight. However, the relatively high coefficient of thermal expansion of aluminum frequently presents problems, which may lead to a considerable decrease of the bearing prestress in the differential gearing when conventional bearing concepts are used. By the use of at least one disk spring, even relatively considerable thermal expansions of aluminum housings can be compensated and the bearing prestress can be kept almost constant even at high operating temperatures.

The ball bearing arrangement can be formed by ball bearings whose outer races are stationarily connected with the differential gearing housing and whose inner races are slid onto shaft sections of the differential holder. The at least one disk spring may be arranged between the differential gearing housing and one of the outer races of the ball bearings.

The ball bearings may be angular contact ball bearings. The angular ball bearings may have an X arrangement.

Other objects, advantages and novel features of the present invention will become apparent from the following detailed description of the invention when considered in conjunction with the accompanying drawings for example.

DETAILED DESCRIPTION

Figure 1:
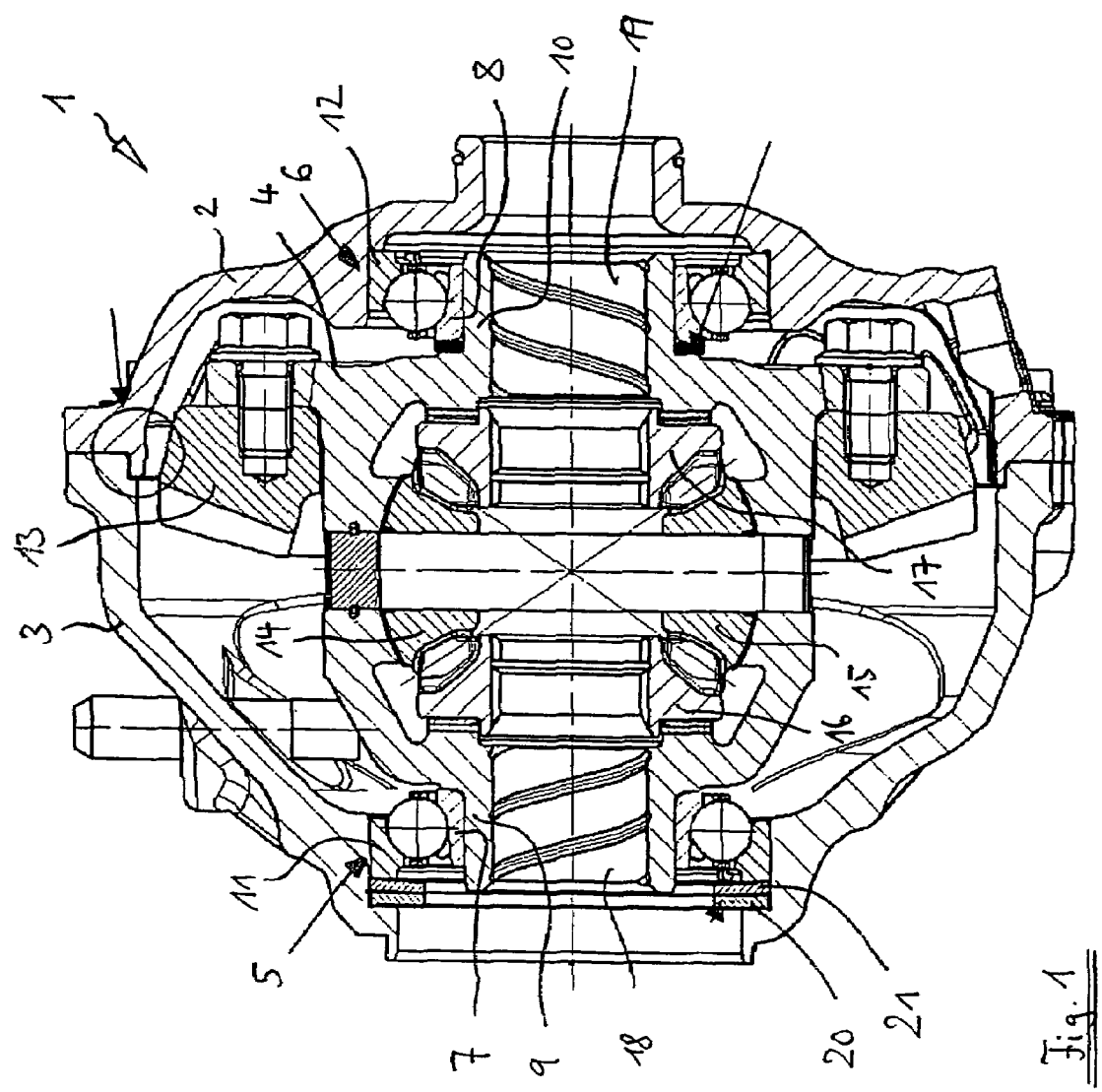
FIG. 1 is a cross-section view of a differential in accordance with an embodiment of the present invention.

FIG. 1 shows a differential gearing 1 with a two-part differential gearing housing which is formed by the two housing halves 2, 3. A differential holder 4 is arranged in the differential gearing housing 2, 3. By way of angular contact ball bearings 5, 6, the differential holder 4 is rotatably disposed in the differential gearing housing 2,3, in which case the inner races 7, 8 of the diagonal contact ball bearings 5, 6 are pushed onto shaft sections 9, 10 of the differential holder 4, and the outer races 11, 12 of the diagonal contact ball bearings 5, 6 are non-rotatably arranged with respect to the differential gearing housing 2, 3.

Torque can be introduced into the differential holder by way of a ring gear 23. By way of differential gears 14, 15, which are rotatably disposed in the differential holder 4, the torque is transmitted to bevel gears 16, 17 which are connected with the ends of the gearing output shafts 18, 19. The differential gears 14, 15 permit a relative rotation of the gearing output shafts 18, 19, which is required, for example, when cornering.

For a perfect operation of the differential gearing, it is required that the angular contact ball bearings 5, 6, here in an X arrangement, have a defined bearing prestress. The angular contact ball bearings 5, 6 are supported by means of their inner races 7, 8 on the shoulders of the differential holder 4. The outer race 12 of the angular contact ball bearing 6 is supported directly at the shoulder of the housing part 2. A disk spring 20 and a distance plate 21 are arranged between the outer race 11 of the angular contact ball bearing 5 and the housing part 3. By way of the distance plate 21, the disk spring 20 transmits an axial force to the outer race 11 of the angular contact ball bearing, whereby the entire ball bearing arrangement is axially braced. For this purpose, the outer race 11 of the bearing has a loose fit with respect to the housing part 3. In contrast, the bearing race of the angular contact ball bearing 6 has an interference fit with respect to the housing part 2.

The differential gearing 1 heats up during the operation, which leads to a thermal expansion of the individual gearing components, particularly of the gearing housing parts 2, 3. Without the disk spring 20, a thermal expansion of the differential gearing housing 2, 3 would lead to a reduction of the bearing prestress of the angular contact ball bearings 5,

6. By means of the disk spring 20, it is achieved that the bearing prestress is kept almost constant even at high operating temperatures, which is required for a quiet running of the toothed wheel work and a long service life.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Differential gearing for vehicles, comprising:
a gearing input and two gearing output shafts which exit on mutually opposite sides of a differential gearing;
 a differential holder arranged in a differential gearing housing in an area between the gearing output shafts and is rotatably supported in differential gearing housing by a ball bearing arrangement; and at least one disk spring, wherein
 the at least one disk spring generates a bearing prestress on the ball bearing arrangement, and
 a distance plate is arranged between the disk spring and one outer race of the bearing.

2. The differential gearing according to claim 1, wherein the differential gearing housing is aluminum.

3. The differential gearing according to claim 1, wherein the ball bearing arrangement has ball bearings whose outer races are non-rotatably arranged with respect to the differential gearing housing.

4. The differential gearing according to claim 2, wherein the ball bearing arrangement has ball bearings whose outer races are non-rotatably arranged with respect to the differential gearing housing.

5. The differential gearing according to claim 3, wherein the at least one disk spring is arranged between the differential gearing housing and one of the outer races of the ball bearing arrangement.

6. The differential gearing according to claim 4, wherein the at least one disk spring is arranged between the differential gearing housing and one of the outer races of the ball bearing arrangement.

7. The differential gearing according to claim 5, wherein the differential gearing housing and said one outer race of the bearing form a loose fit so that, in the event of a thermal expansion of the differential gearing housing, said one outer race of the bearing is axially displaceable in the differential gearing housing.

8. The differential gearing according to claim 6, wherein the differential gearing housing and said one outer race of the bearing form a loose fit so that, in the event of a thermal expansion of the differential gearing housing, said one outer race of the bearing is axially displaceable in the differential gearing housing.

9. The differential gearing according to claim 3, wherein the differential gearing housing and said one outer race of the bearing form a loose fit so that, in the event of a thermal expansion of the differential gearing housing, said one outer race of the bearing is axially displaceable in the differential gearing housing.

10. The differential gearing according to claim 4, wherein the differential gearing housing and said one outer race of the bearing form a loose fit so that, in the event of a thermal expansion of the differential gearing housing, said one outer race of the bearing is axially displaceable in the differential gearing housing.

11. The differential gearing according to claim 1, wherein the ball bearing arrangement has at least two angular contact balls bearings.

12. The differential gearing according to claim 3, wherein the ball bearing arrangement has at least two angular contact balls bearings.

13. The differential gearing according to claim 4, wherein the ball bearing arrangement has at least two angular contact balls bearings.

14. The differential gearing according to claim 7, wherein the ball bearing arrangement has at least two angular contact balls bearings.

15. The differential gearing according to claim 11, wherein the angular contact ball bearings are arranged in an X arrangement.

16. The differential gearing according to claim 14, wherein the angular contact ball bearings are arranged in an X arrangement.

17. The differential gearing according to claim 1, wherein differential gears are disposed at the differential holder, which differential gears mesh with assigned bevel gears of the gearing output shafts and permit a relative rotation of the gearing output shafts.

* * * * *